(12) United States Patent
Aleksic et al.

(10) Patent No.: US 12,437,756 B2
(45) Date of Patent: *Oct. 7, 2025

(54) CROSS-LINGUAL SPEECH RECOGNITION

(71) Applicant: Google LLC, Mountain View, CA (US)

(72) Inventors: Petar Aleksic, Jersey City, NJ (US); Pedro J. Moreno Mengibar, Jersey City, NJ (US)

(73) Assignee: Google LLC, Mountain View, CA (US)

(*) Notice: Subject to any disclaimer, the term of this patent is extended or adjusted under 35 U.S.C. 154(b) by 508 days.

This patent is subject to a terminal disclaimer.

(21) Appl. No.: 17/817,176

(22) Filed: Aug. 3, 2022

(65) Prior Publication Data

US 2022/0383862 A1 Dec. 1, 2022

Related U.S. Application Data

(63) Continuation of application No. 16/593,564, filed on Oct. 4, 2019, now Pat. No. 11,437,025.

(Continued)

(51) Int. Cl.
*G10L 15/18* (2013.01)
*G10L 15/02* (2006.01)
(Continued)

(52) U.S. Cl.
CPC ........... *G10L 15/187* (2013.01); *G10L 15/02* (2013.01); *G10L 15/22* (2013.01); *G10L 2015/025* (2013.01)

(58) Field of Classification Search
CPC ....... G10L 15/00; G10L 15/02; G10L 15/187; G10L 15/22; G10L 15/223; G10L 15/26
See application file for complete search history.

(56) References Cited

U.S. PATENT DOCUMENTS 8,352,246 B1   1/2013 Lloyd
8,731,929 B2 * 5/2014 Kennewick ......... G10L 15/1822
                                                          704/270.1
(Continued)

FOREIGN PATENT DOCUMENTS

EP    2727103 B1    12/2014
JP    2012068345 A   4/2012
JP    2019070799 A   5/2019

*Primary Examiner* — Mark Villena
(74) *Attorney, Agent, or Firm* — Honigman LLP; Brett A. Krueger; Grant Griffith

(57) ABSTRACT

Methods, systems, and apparatus, including computer programs encoded on a computer storage medium, for cross-lingual speech recognition are disclosed. In one aspect, a method includes the actions of determining a context of a second computing device. The actions further include identifying, by a first computing device, an additional pronunciation for a term of multiple terms. The actions further include including the additional pronunciation for the term in the lexicon. The actions further include receiving audio data of an utterance. The actions further include generating a transcription of the utterance by using the lexicon that includes the multiple terms and the pronunciation for each of the multiple terms and the additional pronunciation for the term. The actions further include after generating the transcription of the utterance, removing the additional pronunciation for the term from the lexicon. The actions further include providing, for output, the transcription.

20 Claims, 5 Drawing Sheets

Related U.S. Application Data

(60) Provisional application No. 62/741,250, filed on Oct. 4, 2018.

(51) Int. Cl.
*G10L 15/187* (2013.01)
*G10L 15/22* (2006.01)

(56) References Cited

U.S. PATENT DOCUMENTS

| | | |
|---|---|---|
| 10,186,256 B2 | 1/2019 | Li et al. |
| 2002/0095282 A1 | 7/2002 | Goronzy et al. |
| 2004/0230430 A1 | 11/2004 | Gupta et al. |
| 2009/0326945 A1 | 12/2009 | Tian |
| 2011/0307241 A1* | 12/2011 | Waibel .................. G06F 40/44 704/2 |
| 2013/0317823 A1 | 11/2013 | Mengibar |
| 2015/0081270 A1* | 3/2015 | Kamatani .............. G06F 40/58 704/2 |
| 2016/0103825 A1 | 4/2016 | Ehsani et al. |
| 2016/0336008 A1* | 11/2016 | Menezes .............. G06F 40/295 |
| 2017/0069311 A1 | 3/2017 | Grost et al. |
| 2017/0221475 A1 | 8/2017 | Bruguier et al. |
| 2018/0053502 A1 | 2/2018 | Biadsy et al. |
| 2020/0302950 A1 | 9/2020 | Kawano et al. |

* cited by examiner

CROSS-LINGUAL SPEECH RECOGNITION

CROSS-REFERENCE TO RELATED APPLICATIONS

This U.S. patent application is a continuation of, and claims priority under 35 U.S.C. § 120 from, U.S. patent application Ser. No. 16/593,564, filed on Oct. 4, 2019, which claims priority under 35 U.S.C. § 119(e) to U.S. Provisional Application 62/741,250, filed on Oct. 4, 2018. The disclosures of these prior applications are considered part of the disclosure of this application and are hereby incorporated by reference in their entireties.

TECHNICAL FIELD

This specification related to automated speech recognition.

BACKGROUND

Speech recognition is the ability of a machine or program to identify words and phrases in spoken language and convert them to a machine-readable format. Speech recognition may work using algorithms through acoustic and language modeling. Acoustic modeling represents the relationship between linguistic units of speech and audio signals. Language modeling matches sounds with word sequences to help distinguish between words that sound similar.

SUMMARY

Language modeling is a crucial component of many systems such as Automated Speech Recognition (ASR) and Statistical Machine Translation (SMT). The goal of language modeling is to assign probabilities to text sequences. For example, in ASR, the relative probabilities among several potential text sequences as assigned by the language model can be used to help select the most likely interpretation of an audio input, or utterance.

Language models are trained with large amounts of text data, and therefore tend to be quite generic. The vocabulary of some language models may be limited and words that are out of vocabulary may not be able to be hypothesized by traditional ASR systems using such language models. ASR systems are trained using pronunciations of words available at the training time. However, in certain contexts it may be possible to have available additional, alternate, and/or personalized pronunciations for certain words at runtime.

Contextual ASR systems can, on-the-fly, add out-of-vocabulary words into the vocabulary as well as modify, on-the-fly, probabilities of words and n-grams in language models. The description below describes how to utilize contextual, alternate, and/or personalized pronunciations to improve overall speech recognition accuracy.

Some ASR systems attempt to deal with out-of-vocabulary words, but most assume the pronunciation (e.g., acoustic characteristics) of the words to be in the target language of speech recognition. For example, for an English speech recognizer, out-of-vocabulary words are typically assumed to have English pronunciations. This can lead to inaccurate results when speech includes words pronounced according to a different language, such as when an English ASR system receives speech that includes Spanish words spoken with a Spanish pronunciation. To address this inaccuracy, the techniques in this document not only add words to a lexicon of an ASR system, but also add pronunciations of the words in one or more languages different from the target language, according to the detected context of a device. Words and pronunciations can be added and removed dynamically, based on changes in device context, giving the ASR system the ability to respond to the different tasks, environments, and conditions that the device encounters. This dynamic capability also allows speech recognition models to provide increased accuracy while remaining small and computationally efficient.

The techniques in this document enable ASR systems to more accurately recognize out-of-vocabulary words through the use of additional or alternate pronunciations. In particular, this can enable an ASR system trained and configured to recognize speech in a target language to be dynamically adjusted to recognize certain words in other language that are likely to be spoken given the current context. For example, an English ASR system, without having acoustic models or language models trained on Spanish speech examples, can be temporarily adjusted based on a device's context to recognize certain Spanish terms (e.g., book titles, song titles, location names, proper names, etc.) spoken with a Spanish pronunciation. In the same context or in a different context, the same English ASR system can be temporarily adjusted to recognize certain French terms spoken with a French pronunciation. In this manner, the ASR system is enhanced to accurately recognize words spoken with foreign language pronunciations, whether those words were previously in the lexicon of the ASR system or not.

As discussed further below, an ASR system for a target language can detect a context of a device. In response to detecting the context, the ASR system can cause adjustments that bias recognition toward certain phrases, words, or classes of words relevant to the context. In this process, the ASR system may temporarily add additional foreign-language words and corresponding foreign-language pronunciations. The ASR system may additionally or alternatively add foreign-language pronunciations of words that are already in the lexicon of the ASR system. In some implementations, the ASR system identifies a word in a foreign language different the target language, determines a pronunciation of the word in the foreign language, and then expresses the foreign-language pronunciation in a form that the ASR system can use. For example, the system can covert a foreign-language pronunciation into the phonetic units of the target language using a mapping between phonetic units of the two languages. The ASR system then adjusts the costs or likelihood scores for phrases, words, or classes of words to reflect their relevance to the detected context, allowing words and phrases in the target language and in foreign languages to be recognized when spoken with their respective native pronunciations.

According to an innovative aspect of the subject matter described in this application, a method for cross-lingual speech recognition includes the actions of determining, by a first computing device that includes a speech recognizer that includes an acoustic model, a language model, and a lexicon, a context of a second computing device, wherein the lexicon includes multiple terms and a pronunciation for each of the multiple terms; based on the context of the second computing device: identifying, by the first computing device, an additional pronunciation for a term of the multiple terms; and including, by the first computing device, the additional pronunciation for the term in the lexicon; after including the additional pronunciation for the term in the lexicon, receiving, by the first computing device, audio data of an utterance detected by the second computing device; generating, by the first computing device, a transcription of the utterance by performing speech recognition on the received audio data of the received utterance using the acoustic model, the language model, and the lexicon that includes the multiple terms and the pronunciation for each of the multiple terms and the additional pronunciation for the term; after generating the transcription of the utterance, removing, by the first computing device, the additional pronunciation for the term from the lexicon that includes the multiple terms and the pronunciation for each of the multiple terms and the additional pronunciation for the term; and providing, for output by the first computing device, the transcription of the utterance.

These and other implementations can each optionally include one or more of the following features. The first computing device and the second computing device are a same computing device. The first computing device and the second computing device are different computing devices. The actions further include receiving, by the first computing device, data indicating that the second computing device is likely to receive an utterance. The first computing device determines the context of the second computing device based on receiving the data indicating that the second computing device is likely to receive an utterance. The second computing device is likely to receive an utterance based on the second computing device receiving an utterance of a predefined hotword. The second computing device is likely to receive an utterance based on determining that a particular application is running in a foreground of the second computing device. The second computing device is likely to receive an utterance based on the second computing device receiving an utterance of a predefined hotword.

The actions further include, after providing the transcription of the utterance for output, determining, by the first computing device, an additional context of the second computing device; based on the additional context of the second computing device, identifying, by the first computing device, another term that is not included in the multiple terms and another pronunciation for the other term; including, by the first computing device, the other term and the other pronunciation for the other term in the lexicon; after including the other term and the other pronunciation for the other term in the lexicon, receiving, by the first computing device, additional audio data of an additional utterance detected by the second computing device; generating, by the first computing device, an additional transcription of the additional utterance by performing speech recognition on the additional audio data of the additional utterance using the acoustic model, the language model, and the lexicon that includes the multiple terms and the pronunciation for each of the multiple terms and the other term and the other pronunciation for the other term; after generating the additional transcription of the additional utterance, removing, by the first computing device, the other term and the other pronunciation for the other term from the lexicon that includes the multiple terms and the pronunciation for each of the multiple terms and the other term and the other pronunciation for the other term; and providing, for output by the first computing device, the additional transcription of the additional utterance.

The multiple terms are in a first language. The pronunciation for each of the multiple terms includes phonemes of the first language. The other term is in a second, different language. The other pronunciation for the other term includes phonemes of the second, different language. The other term is not included in any lexicons. The actions further include determining, by the first computing device, an additional context of the second computing device; based on the additional context of the second computing device, identifying, by the first computing device, another pronunciation for the term of the multiple terms; including, by the first computing device, the other pronunciation for the term in the lexicon; after including the other pronunciation for the term in the lexicon, receiving, by the first computing device, additional audio data of an additional utterance detected by the second computing device; generating, by the first computing device, an additional transcription of the additional utterance by performing speech recognition on the additional audio data of the additional utterance using the acoustic model, the language model, and the lexicon that includes the multiple terms and the pronunciation for each of the multiple terms and the other pronunciation for the term; after generating the additional transcription of the additional utterance, removing, by the first computing device, the other pronunciation for the term from the lexicon that includes the multiple terms and the pronunciation for each of the multiple terms and the other pronunciation for the term; and providing, for output by the first computing device, the additional transcription of the additional utterance.

The context of the second computing device is based on a location of the second computing device, an application that is running in a foreground of the second computing device, and characteristics of a user of the second computing device. The language model includes probabilities for sequences of terms of the multiple terms. The acoustic model identifies a phoneme that matches a portion of the audio data. The multiple terms are in a first language. The pronunciation for each of the multiple terms includes phonemes of the first language. The additional pronunciation for the term of the multiple terms includes phonemes of a second, different language. The action of identifying an additional pronunciation for a term of the multiple terms includes receiving, from a third computing device or from a user, the additional pronunciation for the term of the multiple terms. The action of receiving the additional pronunciation for the term of the multiple terms includes receiving, by accessing an API of the third computing device, the additional pronunciation for the term of the multiple terms. The language model is a class-based language model. The actions further include adjusting probabilities of sequences of terms in the language model that include the term.

Other implementations of this aspect include corresponding systems, apparatus, and computer programs recorded on computer storage devices, each configured to perform the operations of the methods. Other implementations of this aspect include a computer-readable medium storing software comprising instructions executable by one or more computers which, upon such execution, cause the one or more computers to perform operations comprising any of the methods described herein.

Particular implementations of the subject matter described in this specification can be implemented so as to realize one or more of the following advantages. The system may be able to recognize pronunciations for words when the user speaks the words using phonemes that are not part of a language that the system is current configured to recognize.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
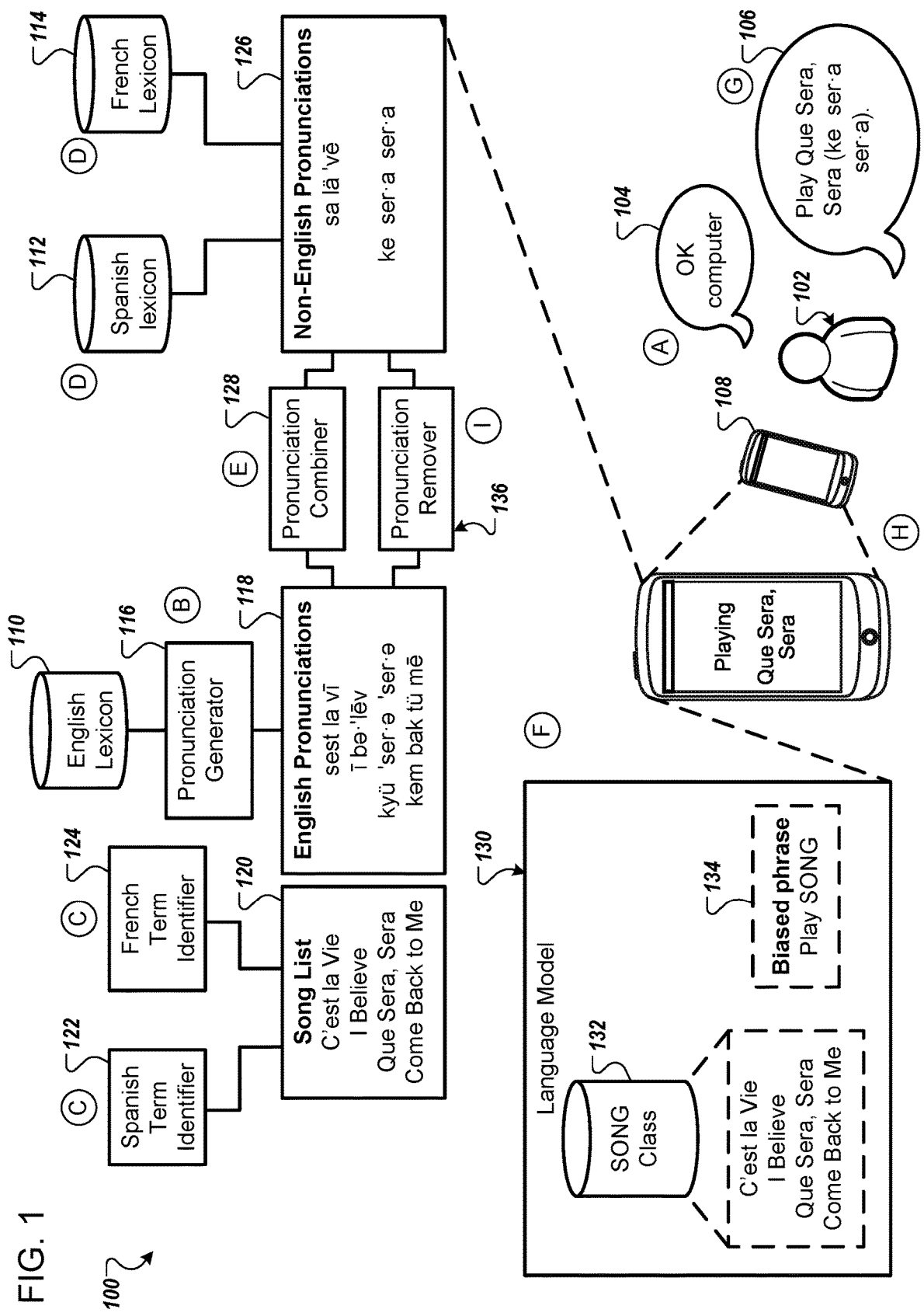
FIG. 1 illustrates an example system for cross-lingual speech recognition.

FIG. 1 illustrates an example system 100 for cross-lingual speech recognition. Briefly, and as described in more detail below, user 102 speaks utterances 104 and 106 "Ok computer, play Que Sera, Sera" in the presence of the computing device 108. The user 102 may be a native English speaker who is able to pronounce "Que Sera, Sera" using Spanish sounds. The computing device 108 is configured to perform speech recognition on English speech. The computing device 108 receives the utterances 104 and 106 and identifies the utterance 106 by supplementing the English lexicon 110 with pronunciations from the Spanish lexicon 112.

In stage A, the user 102 speaks the utterance 104, "Ok computer." The utterance 104 may be a hotword that the user 102 speaks to address the computing device 108 and indicate to the computing device 108 that the user 102 is going to follow the hotword with a command. In response to receiving the hotword 104, the computing device 108 may supplement the English lexicon 110 with foreign words and pronunciation from the Spanish lexicon 112, the French lexicon 114, and/or any other additional lexicons.

To begin the process of identifying additional words and pronunciations to add, the computing device 108 may determine the context of the computing device 108. The context may be based on characteristics of the user 102, the application that the user 102 may be using on the computing device 108, the location of the computing device 108, or any other similar information. For example, the context may be that the computing device is in France. In this instance, the computing device 108 may identify particular French terms and pronunciations to supplement the English lexicon 110. As another example, the context may be that the user 102 is multilingual. In this instance, the computing device 108 may identify particular terms from the other language that the user 102 speaks. As another example, the context may be based on the contacts stored in the computing device 108. If the computing device 108 is able to identify names of a particular country of origin, then the computing device 108 may supplement the English lexicon 110 with words from the language of that country. As another example and as illustrated in FIG. 1, the context may be based on application that the user 102 is interacting with on the computing device 108. The application may be a music application and some of the songs, artists, or albums may be in languages other than the language that the computing device 108.

In stage B, the computing device 108 may anticipate that the user is going to speak the name of a song, artist, or album since the context of the computing device 108 may be that the computing device 108 is playing music in the music player application. The pronunciation generator 116 may generate the English pronunciations 118 for the songs in the song list 120. The song list 120 may include songs with English titles and songs with non-English titles. The pronunciation generator 116 may attempt to generate the pronunciations of the non-English terms using English phonemes. The pronunciation generator 116 may access the English lexicon 110 for the pronunciations of the English terms.

In stage C, the computing device may use non-English identifiers to identify terms in the songs 120 that may be non-English terms. For example, the computing device 108 may use a Spanish term identifier 122 to identify the Spanish terms in the songs list 120 and a French term identifier 124 to identify the French terms in the song list 120. The Spanish term identifier 122 may identify the terms "que" and "sera." The French term identifier 124 may identify the terms "c'est" and "vie." In some instances, both the Spanish term identifier 122 and the French term identifier 124 may identify the term "la" The French term identifier 124 may indicate that the term "la" is likely French because it is surrounded by French terms.

In stage D, the computing device 108 accesses the Spanish lexicon 112 and the French lexicon 114 to identify the non-English pronunciations 126 for the Spanish and French terms. For example, the computing device 108 may access the pronunciation for the French terms "c'est la vie" from the French lexicon 114 and access the pronunciation for the Spanish terms "que sera, sera" from the Spanish lexicon 112.

In stage E, the pronunciation combiner 128 may combine the non-English pronunciations 126 with the English lexicon 110. The computing device 108 may also update the language model 130 now that new pronunciations have been combined with the English lexicon 110. The language model 130 may be a class-based model. One of the classes of the language model 130 may be the song class 132. The song class 132 may include the names of the songs in the song list 120. In some implementations, the computing device 108 may bias the language model 130 because the computing device 108 combined new pronunciations with the language model 130 in stage F. The language model 130 may be assign a higher score to those candidate transcriptions that include biased phrases. For example, the computing device 134 may bias the phrase "play SONG" where SONG is a placeholder for any of the songs in the song class 132.

The language model 130 may access the non-English pronunciations 126 when identifying terms in the audio data. For example, if the acoustic model identifies the phonemes "plāke sera sera" then the language model may determine that the user is speaking "play que sera sera" by comparing the identified phonemes to the phonemes in the English lexicon 110 and the non-English pronunciations 126. In some implementations, the language model 130 may bias other phrases that include the SONG class or other classes, such as an ARTIST class or an ALBUM class. In this instance, the non-English pronunciations 126 may or may not include pronunciations for artists and albums. In some instances, the biased phrases may include classes with pronunciations in the non-English pronunciations 126. If the user is accessing a maps application, then the language model may bias a CITY class and a STREET class. In some implementations, each biased phrase may include a different score or cost that relates to the level of bias towards the phrase.

With the language model 130 and the non-English pronunciations 126 combined with the English lexicon 110, the computing device receives the utterance 106 in stage G. The user 102 speaks, "Play Que Sera, Sera" using the Spanish pronunciation of the terms "que" and sera." The computing device 108 provides the audio data of the utterance 106 to an acoustic model that recognizes an English phonemes and phonemes included in the non-English pronunciations 126. The computing device 108 provides the candidate phonemes to the language model 130. The language model 130 determines that the phonemes likely match the biased phrase "Play Que Sera, Sera."

In stage H, the computing device 108 performs the action of playing the song Que Sera, Sera based on transcription "Play Que Sera, Sera."

In stage I, after generating the transcription and before or after performing the action of the transcription, the computing device 108 removes the non-English pronunciations 126 from the English lexicon 110. The pronunciation remover 136 may remove the non-English pronunciations 126 from the English lexicon 110 so that the pronunciation combiner 128 may include other pronunciations with the English lexicon 110 before the computing device receives the next utterance.

In some implementations, the computing device may include non-English terms and their corresponding pronunciations with the English lexicon. For example, if the computing device is in France and the user 102 is accessing a maps application, the computing device may include terms of French locations and the corresponding French pronunciations with the English lexicon 110.

Figure 2:
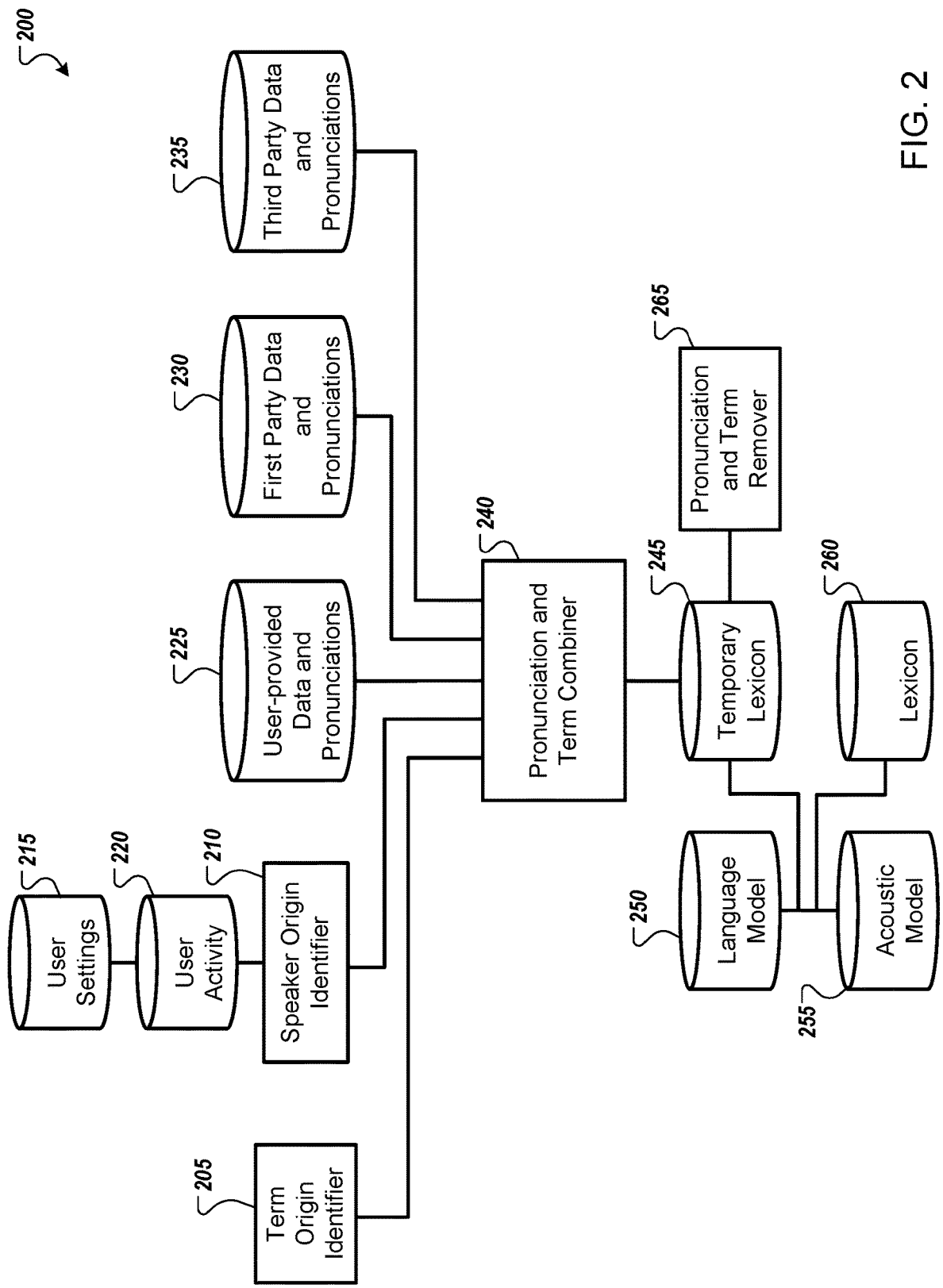
FIG. 2 illustrates an example system that generates alternative pronunciations.

FIG. 2 illustrates an example system 200 that generates alternative pronunciations. Briefly, and as described in more detail below, the system 200 identifies alternate pronunciations for terms based on the context of the device receiving the utterance. The system 200 includes the alternate pronunciations in the lexicon temporarily and removes the alternate pronunciations after the context is no longer present or the user has finished speaking. The system 200 receives the alternate pronunciations or the alternate terms and pronunciations from the various sources illustrated.

The system 200 identifies alternative pronunciations using the term origin identifier 205. The term origin identifier 205 may be configured to determine the language of origin of different terms. For example, the term origin identifier 205 may determine that term "c'est" is French and access the French lexicon for the pronunciation. As another example, the term origin identifier 205 may determine that the term "que" is Spanish and access the Spanish lexicon for the pronunciation.

The system 200 identifies alternative pronunciations using the speaker origin identifier 210. The speaker origin identifier 210 may be configured to determine the country of origin of the speaker, or the primary user of the system 200, which may indicate the speaker's native language. The speaker origin identifier 210 may access the user settings 215 and/or the user activity 220 to determine the speaker's origin. For example, the speaker origin identifier 210 may identify non-English terms that the speaker may enter into the system 200. If the user activity 220 includes previous queries that include some Spanish words, then the speaker origin identifier 210 may determine that the speaker is likely familiar with Spanish pronunciations. As another example, the speaker origin identifier 210 may access user settings 215. The speaker may provide information to the system 200 indicating that the speaker is familiar with Spanish pronunciations. If the speaker origin identifier 210 determines that speaker is familiar with Spanish or another language, then the system 200 may add Spanish pronunciations to the lexicon.

The system 200 identifies alternative pronunciations using the user provided data and pronunciations 225. In some instances, the use may provide express pronunciations for terms input into the system. For example, the user may store a new contact and also include the pronunciation for the contact's name.

The system 200 identifies alternative pronunciations using the first party data and pronunciations 230. In some instances, the system 200 may have access to alternative pronunciations directly. For example, the system 200 may be executing a virtual assistant application. The virtual assistant application may be able to directly access alternative terms and pronunciations based on the input received from the user and/or the context.

The system 200 identifies alternative pronunciations using the third party data and pronunciations 230. In some instances, the system 200 may have access third party devices for alternative pronunciations and/or terms. The system 200 may access the alternative pronunciations and/or terms through an application programming interface (API). As an example, the third party devices may provide the term "chicken4you" and the pronunciation "CHik en" "for" "y oo." The third party data and pronunciations 230 may access the third party device in instances where the user is accessing an application of the third party on the system 200.

The pronunciation and term combiner 240 receives the alternative terms and/or pronunciations from the various sources and adds those alternative terms and/or pronunciations to the temporary lexicon 245. The system 200 also biases the language model 250 based on these terms and/or pronunciations.

When the system 200 receives audio data that corresponds to an utterance, the system 200 access applies the acoustic model 255 and the biased language model 250 to the audio data. The system 200 access the lexicon 260 combined with the temporary lexicon 245. The system 200 generates the transcription of the audio data using these components. The system 200 performs an action based on the transcription. The pronunciation and term remover 265 clears the temporary lexicon 245 after the system 200 performs the action or after the context of the system 200 changes.

In some implementations, contextual pronunciations may be explicitly provided by a component of system 200. There may be a number of use cases where explicit pronunciations can be provided in addition to the contextual words to be used during biasing. A first example may be cloud API, which may be related to third party data and pronunciations 235. In one instance, a developer can provide pronunciations, using a pronunciation team interface, for contextual words relevant to the developer. The biasing may be applied for these words and provided pronunciations also used.

A second example also related to third party data and pronunciations 235, may be third parties where pronunciations for application names that are pronounced in peculiar ways can be provided on the fly and used in contextual phrases that include these application names. In a first instance, an advertiser may provide for company names, e.g., "chicken4you." In a second instance, media companies may provide pronunciations for songs, artists, etc., e.g., "Ke$ha." Other companies may provide specific pronunciations for brands, products, etc.

A third example that is related to user provided data and pronunciations 225 includes personalized pronunciations. For example, a user may include pronunciations of words that are present in the user's personal data such as contacts.

Figure 3:
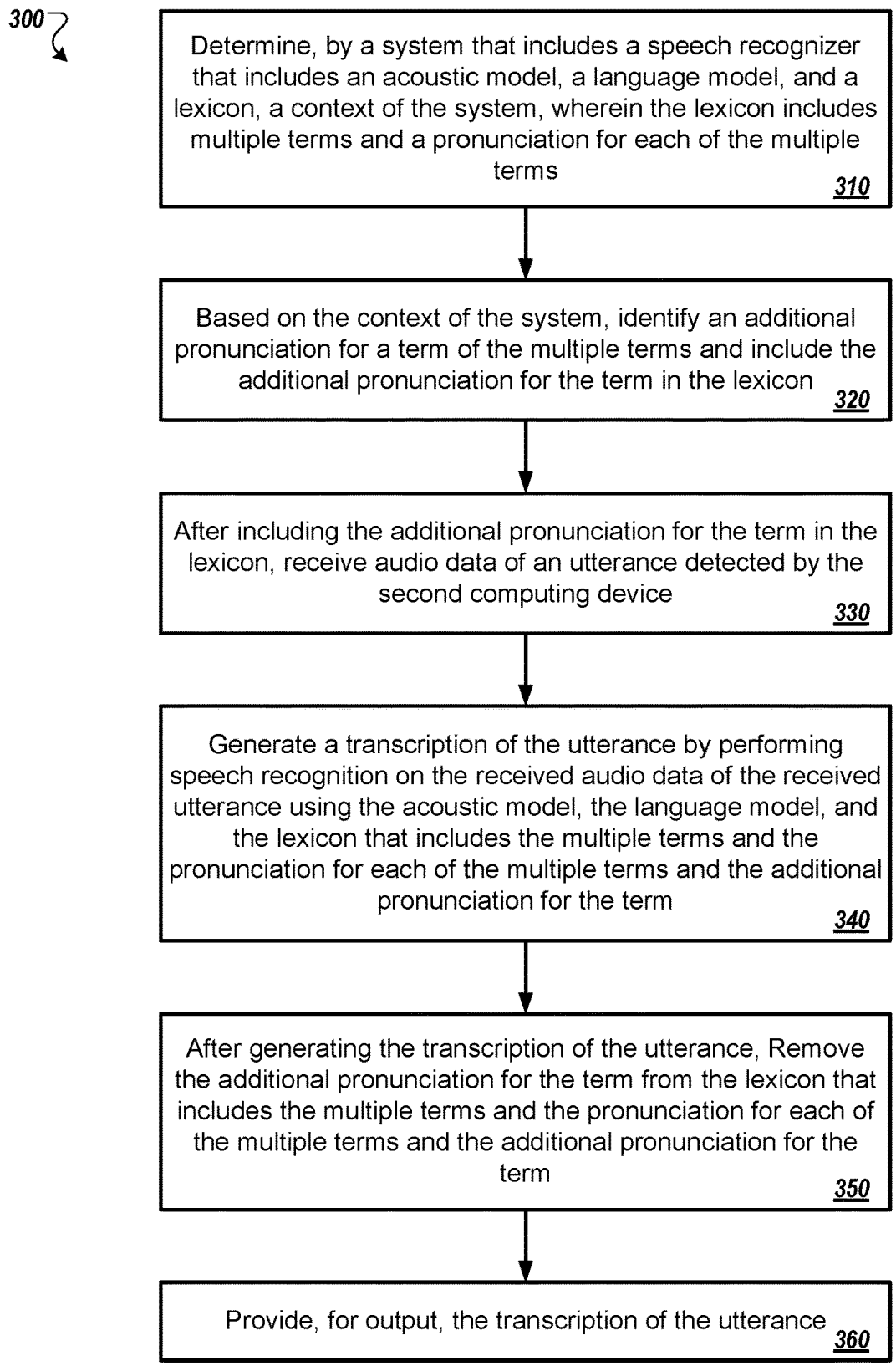
FIG. 3 is a flowchart of an example process for performing cross-lingual speech recognition.

FIG. 3 is a flowchart of an example process for performing cross-lingual speech recognition. In general, the process 300 relates to using the context of a computing device to generate additional pronunciations for terms in the lexicon of a speech recognizer. The process 300 may use the pronunciations to perform speech recognition and then remove the pronunciations from terms of the lexicon after the speech recognition process. The process 300 will be described as being performed by a computer system comprising one or more computers, for example, system 100 of FIG. 1, computing device 108 of FIG. 1, and/or system 200 of FIG. 2.

The system includes a speech recognizer that includes an acoustic model, a language model, and a lexicon and determines a context of the system, where the lexicon includes multiple terms and a pronunciation for each of the multiple terms (310). In some implementations, the system is one computing device, such as mobile phone, tablet, smart speaker, or other similar device. In some implementations, the system is more than one computing device, such as a mobile phone and a server. The mobile phone may receive the audio and transmit the audio to the server. The server may perform speech recognition on the audio and transmit the transcription back to the mobile phone.

In some implementations, the context of the system is based on the location of the system. For example, the system may be located France. In some implementations, the context of the system is based on the application that is running in the foreground of the system. For example, the application may be a music application that has access to songs in a music library. Each song may have a title, an artist, an album, and other similar information that may be included in the context. In some implementations, the context of the system may be based on the characteristics of the user of the system. For example, the user may be a native English speaker.

In some implementations, the language model may include probabilities for sequences of terms of the multiple terms. In some implementations, the language model is a class-based language model. In some implementations, the acoustic model identifies a phoneme that matches a portion of the audio data.

In some implementations, the system receives data indicating that the second computing device is likely to receive an utterance. For example, the data may be an input to the system, such as the user selecting a button on the system indicating that the user is about to speak. This button may be a microphone button. In another example, the data may be opening a certain application, such as a music application. The system may interpret opening of the music application as an indication that the user is about to say a song to play. As another example, the data may be the user speaking a hotword, such as "ok computer." This hotword may indicate that the user is about to speak an additional utterance to the system. In response to receiving the data indicating that the second computing device is likely to receive an utterance, the system may determine the context of the system.

Based on the context of the second computing device, the system identifies an additional pronunciation for a term of the multiple terms and includes the additional pronunciation for the term in the lexicon (320). In some implementations, the multiple terms are in a particular language, such as English, and the pronunciations for each of these multiple terms include English phonemes. The additional pronunciation for the term may include phonemes from a different language, such as French. The user may be a native English, French, or Spanish speaker. In some implementations, the system may select French phonemes for the additional pronunciation because the user is a native French speaker. In some implementations, the user may provide the additional pronunciation. Maybe the user has previously provided the additional pronunciation at the time of storing the term. For example, the user may save a song on the system and provide a pronunciation for the song title. In some implementations, another system may provide the additional pronunciation. For example, a server that provides the music, such as a music streaming service, may provide the additional pronunciation. The system may access an API of the other system.

In some implementations, the system may adjust the probabilities of sequences of terms in the language model that include the term. For example, if the system include multiple pronunciations for various songs in a song library, then the system may bias the language model to phrases that include a song title. The biasing may include adjusting the probabilities of detecting sequences of terms that includes a song title since it may be more likely that a user speaks a phrase that includes a song title.

After including the additional pronunciation for the term in the lexicon, the system receives audio data of an utterance detected by the second computing device (330). For example, the system may receive audio data of a user speaking the title of a song that the user wants to listen to.

The system generates a transcription of the utterance by performing speech recognition on the received audio data of the received utterance using the acoustic model, the language model, and the lexicon that includes the multiple terms and the pronunciation for each of the multiple terms and the additional pronunciation for the term (340). For example, the lexicon may include multiple pronunciations for the same song title.

After generating the transcription of the utterance, the system removes the additional pronunciation for the term from the lexicon that includes the multiple terms and the pronunciation for each of the multiple terms and the additional pronunciation for the term (350). In some implementations, the system removes the additional pronunciation in response to generating the transcription. In some implementations, the system removes the additional pronunciation before receiving an additional utterance. In some implementations, the system removes either the pronunciation or the additional pronunciation depending on which one matches the utterance. For example, if the pronunciation matches the utterance, then the system removes the additional pronunciation. If the additional pronunciation matches the utterance, then the system removes the pronunciation.

The system provides, for output, the transcription of the utterance (360). In some implementations, the system may provide the transcription to an application that is running on the system, such as a music application. In some implementations, the system may provide the transcription for display on a screen of the system.

In some implementations, the process 300 may repeat when the system identifies a different context and a term may not be the lexicon. For example, the term may be included in a song title that includes terms in a different language. In this case, the system may generate an additional pronunciation for the song title and use that pronunciation as part of the speech recognition process. The song title may have the additional pronunciation plus the original pronunciation provided by the system. The system may remove either of the pronunciations after performing speech recognition.

In some implementations, the term may be in a language such as Spanish, and the terms of the lexicon may be in English. The pronunciation of the term may include Spanish phonemes, and the pronunciations of the terms in the English lexicon may include English phonemes. In some implementations, the term may not be in any particular language. For example it may be a made up word as may be the case with some music artists' names.

In some implementations, the process 300 may repeat when the system identifies a different context. The system may generate an additional pronunciation for the term when the context changes. For example, the user may select a new playlist and the term may be used in a different song title. The song title may be in a different language where the term may be pronounced differently but spelled the same.

For contextual language pronunciations, if contextual information is available about the origin of a particular word in a biasing context or about the origin of the speaker, e.g., multilingual speakers, the system can use the contextual information to improve ASR by providing alternate languages pronunciations on the fly. There is a number of use cases that can benefit from this.

A first use case relates to the origin of a particular terms for, for example, contacts, music entities, or geographical entities. The contacts may include, for example, an alternative language pronunciation to improve ASR quality for a Dutch same such as "call Rita Zwaap Ter haar." The music entities, e.g., songs, artists, albums, etc., that may be part of personal content. Recognizing music entities may be difficult when the entity is in a foreign language. A German speaker may use the English pronunciation for U2, e.g., "spiele U2." Geographic entities may also be loaded into the lexicon. While an English user is in Germany, German pronunciations of geographic entities may be loaded so that the ASR can recognize "directions to Zeughauskeller."

A second use case relates to the origin of the speaker who may be multilingual or pronounce words with an accent. If a speaker is known to be multilingual the system can use alternate language pronunciations or alternate language accented pronunciations in the native language for all of the user's contextual content. The system can learn a mapping of accented pronunciation from collected data.

In some instances, the system may be able to identify alternate languages. The alternate languages that may include contextual phrases, words, entities, etc. can be determined in several ways in different points in the pipeline.

The system may determine alternate languages based on the words or phrases. The system may use a language identification classifier, and script, to determine an origin of the word on the fly. The system may use a classifier that checks if the word is common in other languages. The system may use classifiers offline and attach alternate languages to the prebuilt contextual models.

The system may determine alternate languages based on requests or the user. The system may check implicitly what languages are relevant to a user using back ends that analyze user's activity. The system may explicitly check user settings, e.g., a multilingual setting.

The system may determine alternate language based on the location of the user and/or the system. For example, if the user is France, then the system may use French as an alternate language for geographic entities.

The speech recognition system may leverage existing capabilities of incorporating pronunciations for out of vocabulary words and personal entities from the context into the system and this technology expands it to allow for providing alternate pronunciations.

If alternate contextual language is provided for a certain word or an alternate or personalized pronunciation is provided, this word may be treated as an out of vocabulary word and added into the recognizer as a separate dynamic class. In order to compile this out of vocabulary dynamic class the system uses both baseline recognizer language lexicon pronunciations and alternate (language lexicon) pronunciations.

In some implementations, the context server may be a central system that has available as resources, lexicons corresponding to all languages, and the context server performs a creation of out of vocabulary dynamic classes. For each of the alternate languages, the phoneme set is mapped from the source to destination language using a special mapping library.

More specifically, the context may be translated into a mixed model that includes a language model (LM) and/or a lexicon/dictionary (G) that can either accept in-vocabulary words or transduce phonemes into out of vocabulary words. The mixed model is constructed by composing the G for the out of vocabulary words with the LM for the context. The identity relations for in-vocabulary words are added into the G for composition to work. To be able to incorporate alternate pronunciations during context compilation the system may need an G for all words for which there are alternate pronunciations or an alternate language is provided, similar to the one for out of vocabulary words and then incorporate it in the final contextual model that will be the mixed model.

Standard automatic speech recognition (ASR) systems are increasingly expected to recognize foreign entities, yet doing so while preserving accuracy on native words remains a challenge. The description below describes an approach for recognizing foreign words by injecting them with appropriate pronunciations into the recognizer decoder search space on-the-fly. The speech recognition system generates the pronunciations by mapping pronunciations from the foreign language's lexicon to the target recognizer language's phoneme inventory. The speech recognition system automatically learns the phoneme mapping itself using acoustic coupling of text-to-speech (TTS) audio and a pronunciation learning algorithm. In some implementations, the speech recognition system may improve recognition of media-related speech (e.g., song names, artists, movie names, etc.) by incorporating foreign pronunciations into a speech recognizer that is using another language without degrading the speech recognition of general speech.

In some implementations, a speech recognition system is trained and operates at a per language level. However, there are various applications where the correct handling of foreign entities may be important for TTS and ASR. Navigating to foreign geographic locations, querying foreign media entities, and calling personal contacts of foreign origin are scenarios where robustness to foreign entities may prevent recognition errors for ASR and a perceived unnaturalness for TTS services. The description below describes a speech recognition system that is robust to foreign entities. In some implementations, designing a speech recognition system may include training multilingual acoustic models with the objective of building a baseline recognizer for languages where training data is limited. To improve a speech recognition system with language-specific acoustic models, designing a speech recognition system may include building a language robust Grapheme-to-Phoneme (G2P) model to retrieve the right pronunciations for foreign entities. In some implementations, a speech recognition system includes a phoneme-mapping model that uses a word's actual pronunciation in the source language and finds its closest approximation in the target language's phoneme inventory.

The speech recognition system discussed below may be designed to maintain the quality of a per-language recognizer but allow the per-language recognizer to accept foreign words with the mapped pronunciation on-the-fly during decoding in contexts where foreign entities are expected to be more prevalent. An example would be when a French-speaker asks to play an English song. The description below describes a mechanism that adapts dynamic classes to incorporate mapped pronunciations and utilizes contextual biasing to boost the likelihood of various types of foreign entities only in pertinent contexts. In some implementations, designing a speech recognition system may include developing a phoneme mapping between two language pairs using acoustic-phonetic similarity, articulatory feature-based mapping, and learning mappings from data. In some implementations, designing a speech recognition system may include learning the phoneme mapping using TTS synthesized audio and the recognizer. The description below describes a data-driven approach by using a pronunciation learning algorithm on TTS audio to learn the mapping between two languages. This algorithm has the advantage of constraining the parameter space with the graphemes, instead of relying purely on the audio signals. In summary, the advantages of the speech recognition system described below is twofold: a process for automatically learning a phoneme mapping with data using pronunciation learning, and a method to contextually inject foreign words with correct pronunciations into the ASR decoder.

In some implementations, a speech recognition system includes dynamic classes and on-the-fly language model (LM) rescoring to incorporate foreign entities' pronunciations into the decoder based on context.

Dynamic classes, introduced in, can be injected into an LM via an arc coming off the unigram state to provide class-based entities at recognition time. Dynamic classes are constructed from a set of entities such as song names, contact names, device names, etc. into finite state transducers (FSTs). If any entities include out of vocabulary (OOV) words, their pronunciations are obtained on-the-fly and directly included in the dynamic class. Specifically, for a dynamic class d, we build a $G_d$ (FST over words) for all OOV words, and then a d-specific lexicon $L_d$ providing pronunciations for the OOV words in $G_d$. The dynamic class FST incorporates the OOV construct by building $G'_d$ as follows:

$$G'_d = Det(L_d) \circ^\circ G_d$$

Figure 4:
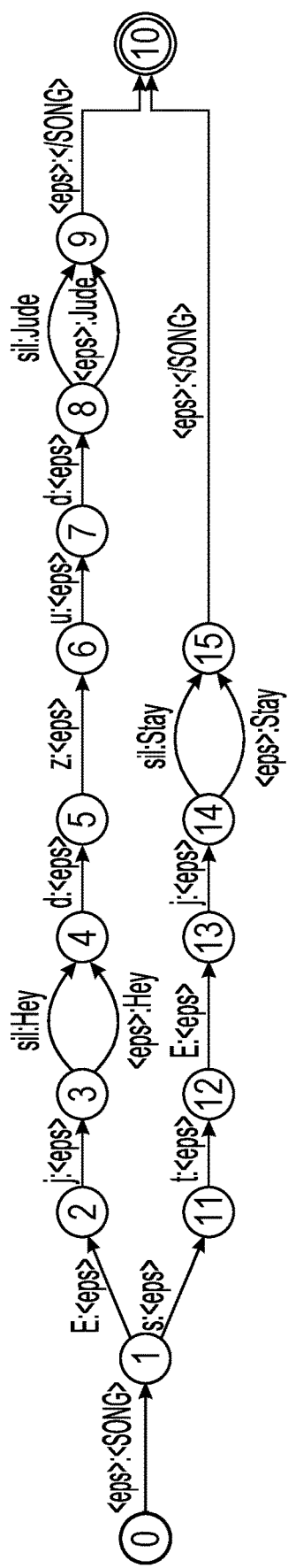
FIG. 4 illustrates an example of dynamic class containing two English entities to be used in the French recognizer.

To correctly recognize foreign entities, the speech recognition system may generalize the dynamic class construction process by additionally considering the source language for each instance. Based on the language information, which can be supplied with the instance or inferred online using a language classifier, the speech recognition system may include any foreign word whose language is different from that of the target recognizer into $G_d$ regardless of whether the word is an OOV or not. During the $L_d$ construction, the speech recognition system may use the language information to decide from which language's lexicon to fetch the pronunciation. The speech recognition system maps the pronunciations of foreign words into the recognizer language's phoneme set using phoneme mapping. The resultant $G'_d$ then encompasses their approximate pronunciations. FIG. 4 illustrates an example of $SONG dynamic class containing two English song entities to be used in the French recognizer. After construction of the class, a dynamic class may be spliced into the base LM with a certain LM cost on the class open tag arc to avoid over-triggering. The speech recognition system may adjust the class LM cost on-the-fly based on contextual information.

To ensure that the dynamic class is not pruned out during decoding, the speech recognition system may contextually lower the LM cost associated with the dynamic class of interest using on-the-fly LM rescoring (biasing).

The context is captured using a set of biasing phrases relevant for a particular dynamic class. For example, in the case of $SONG dynamic class, relevant phrases are listed in Table 1. These phrases include the class name ($SONG) as a placeholder for any instance belonging to that class.

TABLE 1

French and German $SONG biasing phrases.

| French biasing phrases | German biasing phrases |
| --- | --- |
| mets $SONG | spiel $SONG |
| jouer $SONG | spiele $SONG |

The phrases may be compiled into a biasing model represented as a weighted FST. The weight of any n-gram in the biasing model represents how much the LM cost of that particular n-gram will be altered. These weights can be learned from logs or explicitly set per context. In some implementations, a speech recognition system may use unigram/bigram method of assigning biasing weights, where all biasing unigrams have identical weights, as well as bigrams.

For each word emitted during decoding, the cost from the original LM, G, and the cost from the biasing model, B, determine the actual cost as follows:

$$s(w|H) = \begin{cases} s_G(w|H), & \text{if } (w|H) \notin B \\ C(s_G(w|H), s_B(w|H))), & \text{if } (w|H) \in B \end{cases}$$

where $s_G(w|H)$ and $s_B(w|H)$ are the costs of the word w with history H from G and B respectively. Using a linear interpolation together with a minimum function for C ensures that the costs can only be decreased with biasing:

$$C(s_G(w|H), s_B(w|H)) = \min(s_G(w|H), \alpha s_G(w|H) + \beta s_B(w|H))$$

where $\alpha$ and $\beta$ are constants.

Each dynamic class entity is assigned a biasing weight corresponding to the weight associated to $SONG in biasing phrases.

The acoustic coupling method for learning a cross-lingual mapping may rely on a set of pronunciations in the source language, a TTS system for the source language that can generate audio for these pronunciations, and a pronunciation learning system in the target language. The speech recognition system may use these to generate the source/target language pronunciation pairs that are used to learn the phoneme mapping; the mapping can then generate target language pronunciations from novel source language pronunciations. Additionally, in some implementations, languages' phoneme inventories are a subset of language-independent Extended Speech Assessment Methods Phonetic Alphabet (X-SAMPA); therefore, the speech recognition system may only need to generate mappings for source language phonemes that are not present in the target language inventory (e.g., 47.5% of phonemes when mapping English to French, and 20% of phonemes when mapping English to German).

Given native source language words for which the speech recognition system has a human-sourced pronunciation, the speech recognition system synthesizes audio of the pronunciation using a TTS voice in the source language. Using TTS audio rather than standard datasets allows the system to be identify the pronunciation used in the audio. To get a representative distribution over phonemes in different contexts, the speech recognition system synthesizes the pronunciations of a large set of native words.

To learn the pronunciations from the synthesized audio, the speech recognition system uses FSTs to generate pronunciation candidates based on the graphemes. The pronunciation model score from the FST is combined with the acoustic model score to determine the most likely pronunciation given the audio and the graphemes. The FST used may be created from a Recurrent Neural Network-Transducer (RNN-transducer)—a sequence-to-sequence neural model. This scheme may provide an infinite number of weighted pronunciation candidates, with the graphemes serving as a useful additional cue. For example, for an acoustic model trained only on French data, acoustic similarity alone might suggest a mapping from English to French of the glottal fricative /h/ to the rhotic uvular fricative /R/. However, in practice, French speakers may assign a high weight to the difference in rhoticity, making a deletion of /h/ the better model.

Given the source and target language pronunciation pairs, the speech recognition system may find the best alignments between the constituent phonemes, which may by similar to the first step of training a joint-sequence grapheme to phoneme model. The speech recognition system may allow a one-to-many source phoneme to target phoneme alignment. Each phoneme in the source pronunciation can correspond to 0-2 consecutive phonemes in the target pronunciation. Let $$q = (s, t) \in \left( S \times \bigcup_{i=0,1,2} T_i \right).$$

Where q is the alignment, S is the set of source phonemes, T is the set of target phonemes, and $T_i$ is the set of all strings made of elements of T of length i. The set of alignments between a source and target phoneme sequence s and t is $$A(s,t) = \{q_1 \ldots q_n \varepsilon q^* | s_1 \ldots s_n = s; t_1 \ldots t_n = t\}$$

where A(s, t) is a matrix of the phoneme sequences and $q_i = (s_i, t_i)$.

The speech recognition system applies the expectation-maximization algorithm on an observation set O of (s, t) pairs to iteratively estimate estimation values p, for p(q) that optimize the likelihood of the training data:

$$\log (p(O)) = \sum_{(s,t) \in O} \log \left( \sum_{q_1 \ldots q_n \in A(s,t)} \prod_{i=1}^{n} p(qi) \right)$$

The mapping is then defined as $$\text{mapping } (s) \atop S \to T = \begin{cases} s, & \text{if } s \in T \\ \arg\max_t p(s, t), & \text{otherwise} \end{cases}$$

The one-to-many mapping may be useful in the case of diphthongs—by definition, a combination of two vowels sounds—or in cases like the velar nasal /N/ which might be better approximated by a concatenation of the palatal nasal and velar stop /n g/ than by either of them alone.

The speech recognition system compares acoustic coupling results to a linguistically informed manual mapping with the same constraints: each source language phoneme not in the target language inventory maps to a sequence of 0-2 target language phonemes. Between the manual and acoustic coupling mapping, there may be differences in the mappings, e.g., 30% of all English phonemes when mapped to French and 10% when mapped to German.

The discussion above presents an approach to recognize foreign entities based on context without hurting recognition on native words, through dynamic classes with pronunciation mapping and contextual rescoring. This allows the speech recognition system to reduce the word error rate (WER) on foreign media words by, e.g., an additional 55% on top of the gains achieved using contextual rescoring, and the gain may translate to improvement on real media queries. The phoneme mapping learned through acoustic coupling—without ground truth target language pronunciations or linguistic knowledge—may be comparable to a human-generated mapping.

Figure 5:
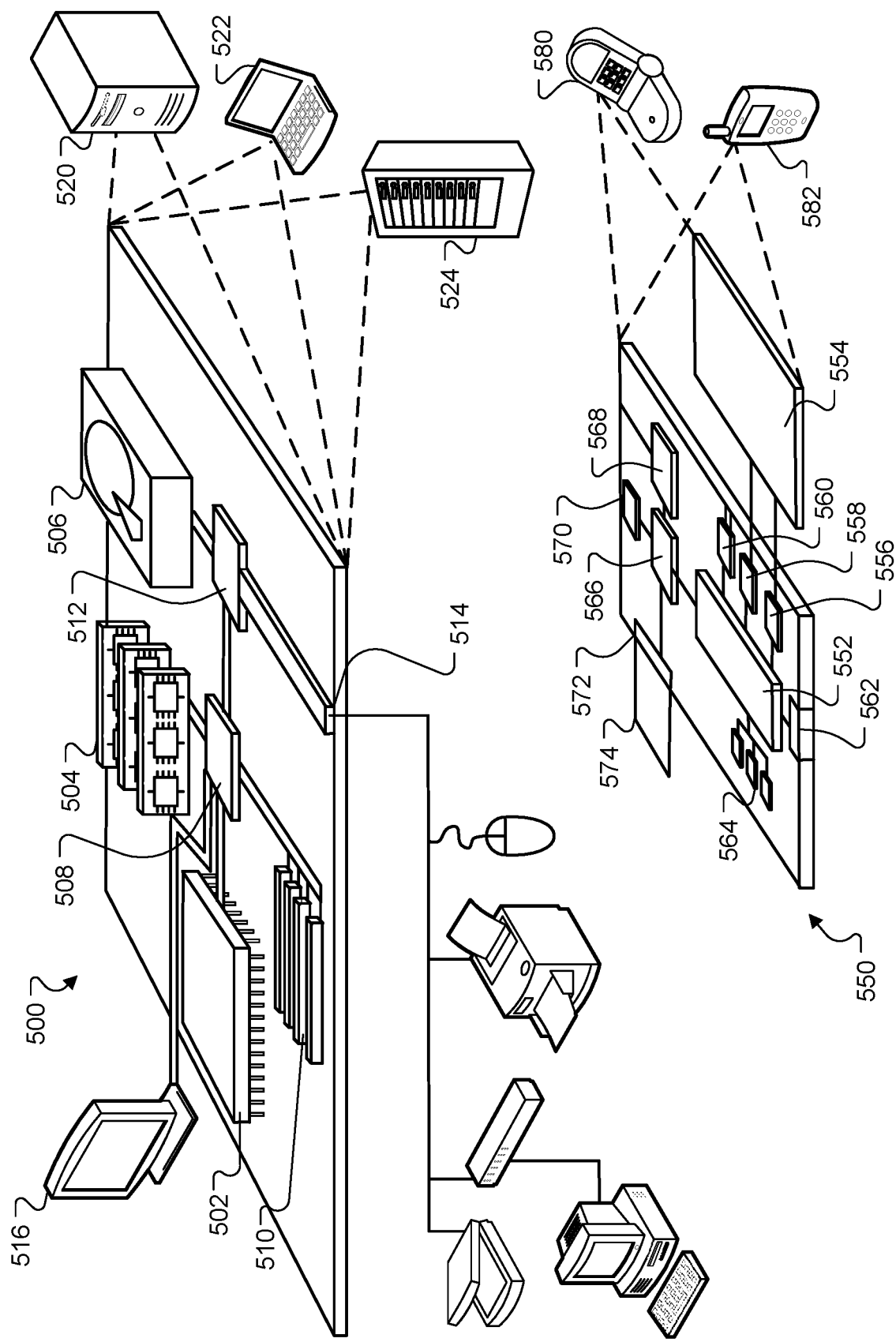
FIG. 5 is an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

The invention claimed is:

1. A computer-implemented method when executed by data processing hardware causes the data processing hardware to perform operations comprising:
   determining a context of a computing device, the computing device comprising a lexicon including multiple terms in a first language and a pronunciation for each of the multiple terms in the first language;
   based on the context of the computing device:
       identifying, for inclusion in the lexicon, one or more additional terms and a pronunciation for each of the one or more additional terms, the one or more additional terms in a second language different from the first language, wherein each respective term of the multiple terms in the first language and each respective term of the one or more additional terms in the second language comprises a corresponding likelihood score; and
       for each respective term of the one or more additional terms in the second language, biasing the corresponding likelihood score based on the context of the computing device;
   receiving audio data of an utterance comprising at least one word in the first language and at least one word in the second language;
   based on the corresponding likelihood scores of the multiple terms in the first language and the biased corresponding likelihood scores of the one or more additional terms in the second language, generating, by performing speech recognition on the received audio data of the utterance using the lexicon, a transcription of the utterance, the transcription comprising the at least one word in the first language and the at least one word in the second language; and
   providing, for output, the transcription of the utterance.

2. The method of claim 1, wherein the operations further comprise, after generating the transcription of the utterance, removing the pronunciation for each of the one or more additional terms in the second language from the lexicon.

3. The method of claim 1, wherein the operations further comprise:
   receiving data indicating that the computing device is likely to receive the utterance,
   wherein determining the context of the computing device is based on receiving the data indicating that the computing device is likely to receive the utterance.

4. The method of claim 3, wherein the computing device is likely to receive the utterance based on the computing device receiving an initial utterance of a predefined hotword.

5. The method of claim 3, wherein the computing device is likely to receive the utterance based on determining that a particular application is running in a foreground of the computing device.

6. The method of claim 1, wherein the operations further comprise:
   after providing the transcription of the utterance for output, determining an additional context of the computing device;
   based on the additional context of the computing device, identifying, for inclusion in the lexicon, another term that is not included in the multiple terms and another pronunciation for the other term;
   receiving additional audio data of an additional utterance;
   generating, by performing speech recognition on the additional audio data of the additional utterance using the lexicon, an additional transcription of the additional utterance;
   after generating the additional transcription of the additional utterance, removing the other term and the other pronunciation for the other term from the lexicon; and
   providing, for output, the additional transcription of the additional utterance.

7. The method of claim 6, wherein:
   the pronunciation for each of the multiple terms in the first language includes phonemes of the first language;
   the other term is in the second language; and
   the other pronunciation for the other term includes phonemes of the second language.

8. The method of claim 6, wherein the other term is not included in the lexicon.

9. The method of claim 1, wherein:
   the pronunciation for each of the multiple terms includes phonemes of the first language; and
   an additional pronunciation for one of the terms of the multiple terms includes phonemes of the second language.

10. The method of claim 1, wherein the operations further comprise adjusting probabilities of sequences of terms of the multiple terms.

11. A system comprising:
    data processing hardware; and
    memory hardware in communication with the data processing hardware, the memory hardware storing instructions that when executed on the data processing hardware cause the data processing hardware to perform operations comprising:
      determining a context of a computing device, the computing device comprising a lexicon including multiple terms in a first language and a pronunciation for each of the multiple terms in the first language;
      based on the context of the computing device:
        identifying, for inclusion in the lexicon, one or more additional terms and a pronunciation for each of the one or more additional terms, the one or more additional terms in a second language different than the first language, wherein each respective term of the multiple terms in the first language and each respective term of the one or more additional terms in the second language comprises a corresponding likelihood score; and
        for each respective term of the one or more additional terms in the second language, biasing the corresponding likelihood score based on the context of the computing device;
      receiving audio data of an utterance comprising at least one word in the first language and at least one word in the second language;
      based on the corresponding likelihood scores of the multiple terms in the first language and the biased corresponding likelihood scores of the one or more additional terms in the second language, generating, by performing speech recognition on the received audio data of the utterance using the lexicon, a transcription of the utterance, the transcription comprising the at least one word in the first language and the at least one word in the second language; and
      providing, for output, the transcription of the utterance.

12. The system of claim 11, wherein the operations further comprise, after generating the transcription of the utterance, removing the pronunciation for each of the one or more additional terms in the second language from the lexicon.

13. The system of claim 11, wherein the operations further comprise:
    receiving data indicating that the computing device is likely to receive the utterance,
    wherein determining the context of the computing device is based on receiving the data indicating that the computing device is likely to receive the utterance.

14. The system of claim 13, wherein the computing device is likely to receive the utterance based on the computing device receiving an initial utterance of a predefined hotword.

15. The system of claim 13, wherein the computing device is likely to receive the utterance based on determining that a particular application is running in a foreground of the computing device.

16. The system of claim 11, wherein the operations further comprise:
    after providing the transcription of the utterance for output, determining an additional context of the computing device;
    based on the additional context of the computing device, identifying, for inclusion in the lexicon, another term that is not included in the multiple terms and another pronunciation for the other term;
    receiving additional audio data of an additional utterance;
    generating an additional transcription of the additional utterance by performing speech recognition on the additional audio data of the additional utterance using the lexicon;
    after generating the additional transcription of the additional utterance, removing the other term and the other pronunciation for the other term from the lexicon; and
    providing, for output, the additional transcription of the additional utterance.

17. The system of claim 16, wherein:
    the pronunciation for each of the multiple terms in the first language includes phonemes of the first language;
    the other term is in the second language; and
    the other pronunciation for the other term includes phonemes of the second language.

18. The system of claim 16, wherein the other term is not included in the lexicon.

19. The system of claim 11, wherein:
    the pronunciation for each of the multiple terms includes phonemes of the first language; and
    an additional pronunciation for one of the terms of the multiple terms includes phonemes of the second language.

20. The system of claim 11, wherein the operations further comprise adjusting probabilities of sequences of terms of the multiple terms.

* * * * *